United States Patent
Borwig et al.

(10) Patent No.: US 7,234,734 B2
(45) Date of Patent: Jun. 26, 2007

(54) INTEGRAL TRANSVERSE FLANGES FOR A DUCT CONNECTING SYSTEM

(75) Inventors: Michael C. Borwig, Swisher, IA (US); John J. Toben, Cedar Rapids, IA (US)

(73) Assignee: Met-Coil Systems, LLC, Westfield, MA (US)

(*) Notice: Subject to any disclaimer, the term of this patent is extended or adjusted under 35 U.S.C. 154(b) by 114 days.

(21) Appl. No.: 11/047,413

(22) Filed: Jan. 31, 2005

(65) Prior Publication Data

US 2006/0170216 A1    Aug. 3, 2006

(51) Int. Cl.
*F16L 35/00* (2006.01)
(52) U.S. Cl. .................................... 285/424
(58) Field of Classification Search ............... 285/424, 285/412
See application file for complete search history.

(56) References Cited

U.S. PATENT DOCUMENTS

| | | | |
|---|---|---|---|
| 3,199,901 A * | 8/1965 | Jeppsson ................... 285/364 |
| 4,447,079 A * | 5/1984 | Sullivan .................... 285/363 |
| 4,466,641 A | 8/1984 | Heilman et al. |
| 4,558,892 A * | 12/1985 | Daw et al. ................. 285/331 |
| 4,564,227 A | 1/1986 | Murck |
| 4,579,375 A | 4/1986 | Fischer et al. |
| 4,940,264 A * | 7/1990 | Mez ........................... 285/405 |
| 4,995,648 A | 2/1991 | Jackson |
| 5,054,823 A * | 10/1991 | Arnoldt .................... 285/363 |
| 5,165,736 A * | 11/1992 | De Waal .................... 285/424 |
| 5,283,944 A | 2/1994 | Goodhue |
| 5,321,880 A | 6/1994 | Goodhue |
| 5,342,100 A | 8/1994 | Goodhue |
| 5,358,013 A | 10/1994 | McClain |
| 5,450,879 A * | 9/1995 | Toben ....................... 138/109 |
| 5,926,937 A | 7/1999 | Goodhue |
| 6,109,665 A | 8/2000 | Meinig |
| 6,412,519 B1 | 7/2002 | Goodhue |
| 6,547,287 B1 | 4/2003 | Shah et al. |
| 6,550,823 B1 * | 4/2003 | Siegwart .................... 285/344 |

\* cited by examiner

*Primary Examiner*—David Bochna
(74) *Attorney, Agent, or Firm*—McCormick, Paulding & Huber LLP

(57) ABSTRACT

An integral transverse flange for a duct includes a first upturned portion extending substantially perpendicularly from a duct wall of the duct. The flange further includes a second portion bent rearwardly from the first upturned portion, and a third return portion turned toward the duct wall and rounded back toward the first upturned portion from the second portion. A fourth L-shaped portion extends from the third return portion, the L-shaped portion having a first arm arranged adjacent to and in close relation with the second portion and a second arm arranged adjacent to and in close relation with the first upturned portion. A bead is formed in the first upturned portion.

9 Claims, 2 Drawing Sheets

INTEGRAL TRANSVERSE FLANGES FOR A DUCT CONNECTING SYSTEM

FIELD OF INVENTION

The present invention relates, in general, to integral transverse flanges for a duct connecting system, and deals more particularly with integral transverse flanges having increased strength and sealing ability.

BACKGROUND OF THE INVENTION

Integral transverse flanges formed on the distal ends of rectangular ducts are well known in the art. These integral transverse flanges typically utilize angular corner connectors and related hardware to join with the opposing distal ends of matching rectangular ducts having similar integral transverse flanges.

Owing to the vital role played by the integral transverse flanges, the structural integrity, strength and sealing ability of the flanges is of significant consideration.

The prior art, particularly Heilman et al. (U.S. Pat. No. 4,466,641) and Fischer et al. (U.S. Pat. No. 4,579,375), the disclosures of which are incorporated herein by reference, disclose duct connecting systems using integral transverse flanges. These arrangements include a first portion extending perpendicularly outwardly from the duct wall and a second portion bent rearwardly from the outer end of the first portion thereby forming opposing channels. The side edges of an arm of a corner connector are adapted to be snapped and crimped into place in these channels for secure assembly. To hold the adjacent duct sections together, the adjacent sections are bolted to each other at their four corner connectors, thereby forming an assembled section of duct.

Apparatus to manufacture the Heilman et al. invention is manufactured and sold by The Lockformer Company of Lisle, Ill. and is referred to in the industry as the TDC ("Transverse Duct Connector") system. Apparatus to manufacture the Fischer et al. duct is manufactured and sold by Engel Industries, Inc., of St. Louis, Mo. and is referred to in the industry as the TDF ("Transverse Duct Flange") system. While both systems have provided the industry with a useful duct system, primarily the TDC system, there remains a need in the industry for improvements to the systems as discussed herein.

FIG. 1 illustrates in cross section the roll-formed shape of the end 10 of one duct, and the roll-formed shape of the end 12 of an adjacent duct as disclosed in Heilman et al. The frame includes a first upturned portion 14 extending perpendicularly outwardly from the duct wall 16 and a second portion 18 bent rearwardly into position opposite an end portion of the duct wall. The width of an arm of a corner connector 20 substantially corresponds to the distance between the rearwardly bent portion 18 and the end portion of the duct wall. The side edges of each such arm of a corner connector 20 are adapted to engage the respective surfaces of the rearwardly bent second portion 18 and duct wall end portion whereby the corner connector 20 is held in position relative to the frame by a retainer means defined by the rearwardly bent second portion 18.

The preferred embodiment of the Heilman et al. invention includes a third outwardly facing return portion 22 at the outward edge of the rearwardly bent second portion 18 thereby forming a bead 24. A first channel 26 is formed between the bead 24 and the outwardly extending upturned portion 14, and a second channel 28 is formed in the duct wall opposite the first channel 26. The side edges of an arm of a corner connector 20 are adapted to be snapped into place in these channels 26, 28 for secure assembly of the corner connectors relative to a frame. It has been found, however, that the corner connectors will b displaced during manufacture and transport of the duct. Therefore, the duct flanges must be crimped (not shown in FIG. 1) over the adjacent arms of a corner connector to secure the corner connector in place within a duct flange.

Pursuant to Heilman et al., when assembling one duct with another, the respective frames and associated corner connectors 20 are brought together, and a bolt 30 or other suitable fastener is employed for achieving the desired connection. Prior to completion of this connection, a gasket 32 may be located between the respective frame portions for conventional purposes.

In order to strengthen the resultant duct joint formed by the Heilman et al. invention, each of the arms of a corner connection 20 is provided with an offset ear which may be used for retaining a stiffener means, comprising a strip of spring steel or the like. Each stiffener means is held at its end beneath the offset ear and at its sides between channels 26 and 28. Furthermore, a clip 34 may also be engaged around the adjacent frame portions to provide a smooth exposed joint and to strengthen the joint.

The Fischer et al. duct flange, illustrated at FIG. 2, uses a modification of the Heilman et al. invention and discloses a duct connecting system having an outstanding web portion 36 extending at 90 degrees from the duct wall 38, with an outward-formed tracking ridge 40 spaced inwardly thereof and formed outwardly of the surface of the assembled duct wall 38. At the outer extremity of the web 36 is an outer flange 42 having a turned-under rounded edge 44, formed at an angle slightly in excess of 180 degrees and terminating in a spring margin 46 which extends back toward the web 36 and normally stands inwardly away from the outer flange 42. "Button lock" lances are said to be provided through the rounded-back edge 44 projecting aft. The spacing between the web 36 and the tracking ridge 40, which corresponds to the spacing from the web 36 of the somewhat bulbous rounded portion of the turned-under edge 44, is fixed to accommodate the side edges of an arm of a corner connector. The depth between the spring margin 46 and the outer surface of the duct wall 38 between the ridge 40 and the web 36, is such that the leg portions of a corner connector will snap into position and are said to be held by the spring margins 46 and the lanced projections, trapped by the tracking ridge 40. However, it has also been found that corner connectors will fall out of the Fischer et al. duct flange without crimping. Accordingly, the duct flange of the Fischer et al. duct, in practice, is crimped to hold a corner connector in place.

As with the Heilman et al. invention, the Fischer et al. duct can be readily joined with an adjacent duct end by means of bolts or fasteners. Furthermore, gasket material may also be located between adjacent frames without difficulty to decrease leakage.

In order to increase duct flange strength about the duct joint formed by the Fischer et al. invention, optional reinforcing bars may be utilized between the arms of adjacent corner pieces. Each bar may be snapped in position behind the outwardly formed ridge 40 and the rounded edge 44 of the outer flange 42, and retained by the lanced projections. If desired, and elongated clip can also be positioned around the joint formed by adjacent duct flanges to support the middle portion of the integral flanges. Incorporation of the clip and reinforcing bar with adjacent duct flanges helps to prevent bellowing and leakage caused by pressure exerted by materials flowing within the duct.

FIG. 3 illustrates yet another known integral transverse flange 52. As shown in FIG. 3, the integral transverse duct flange 52 generally comprises a duct having a duct wall 50, defining an inside surface 54 and an outside surface 56. The flange 52 has an inside surface that is continuous with the inside of the duct wall 50 and an outside surface that is continuous with the outside surface of the duct wall 50. The flange 52 includes an upturned portion 58 extending perpendicularly from the duct wall 50.

More specifically, the flange 52 comprises the upturned portion 58 which extends perpendicularly from duct wall 50 and a second rearwardly bent portion 60 extending opposite a portion of duct wall 50. The end of rearwardly bent portion 60 is turned away from duct wall 50 and rounded back toward the upturned portion 58, forming a return portion 62. Return portion 62 is extended to form a L-shaped double wall portion 64 having a first arm 66 arranged adjacent to and in close relation with the inside surface of rearwardly bent portion 60 and a second arm 68 arranged adjacent to and in close relation with the inside surface of upturned portion 58.

Second arm 68 extends toward duct wall 50 a distance substantially less than the length of upturned portion 58. As also shown in FIG. 3, the second arm 68 of L-shaped portion 64 extends a distance less than half the length of upturned portion 58.

Although the integral transverse flanges illustrated in FIGS. 1–3 are suitable for a wide range of applications, there exists a need in the art for structurally stronger integral transverse flanges having an increased sealing capability.

With the forgoing problems and concerns in mind, it is the general object of the present invention to provide integral transverse flanges for a duct connecting system that will evidence a strengthened first upturned portion, a smooth mating surface between opposing transverse flanges and a defined channel to accommodate a sealant or the like.

SUMMARY OF THE INVENTION

It is one object of the present invention is to provide an integral transverse duct flange having an L-shaped double wall portion arranged adjacent to the flange and opposite a duct wall.

It is another object of the present invention is to provide a transverse duct flange which provides increased strength and rigidity across the joint created by adjacent integral transverse duct flanges.

It is another object of the present invention is to provide a transverse duct flange which will allow for the use of the thinner gauge sheet metal in the construction of duct while providing the strength of a conventional duct flange using heavier gauge sheet metal.

It is another object of the present invention is to provide a transverse duct flange having additional strength which will alleviate the problems of bulging and leakage at adjacent duct flange joints.

A further object of the invention is to provide a transverse duct flange having additional strength which will alleviate the need to insert stiffeners or reinforcing bars, in certain applications, into the duct flange in order to strengthen the duct flange as is currently implemented with the prior art flanges.

A further object of the invention is to decrease the number of clips that are engaged about the respective connected adjacent flange portions to prevent leakage.

A further object of the invention is to provide a more cost efficient means of manufacturing and connecting sheet metal duct than the prior art.

It is another object of the present invention is to provide an integral transverse flange that defines a channel adapted to receive sealant or the like.

In accordance, therefore, with one embodiment, it is an object of the present invention to provide an integral transverse flange for a duct including a first upturned portion extending substantially perpendicularly from a duct wall of the duct. The flange further includes a second portion bent rearwardly from the first upturned portion, and a third return portion turned toward the duct wall and rounded back toward the first upturned portion from the second portion. A fourth L-shaped portion extends from the third return portion, the L-shaped portion having a first arm arranged adjacent to and in close relation with the second portion and a second arm arranged adjacent to and in close relation with the first upturned portion. A bead is formed in the first upturned portion.

These and other objectives of the present invention, and their preferred embodiments, shall become clear by consideration of the specification, claims and drawings taken as a whole.

DETAILED DESCRIPTION OF THE PREFERRED EMBODIMENTS

Figure 4:
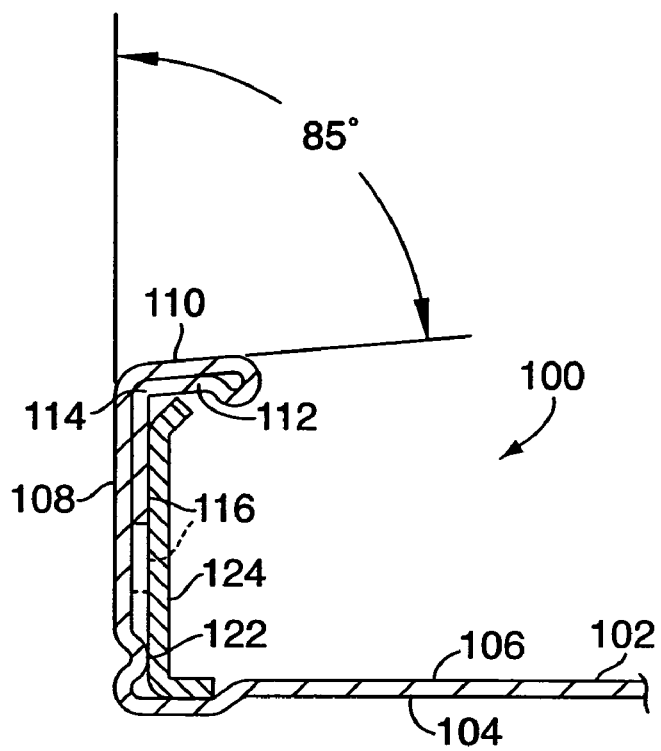
FIG. 4 is a cross-sectional view of an integral transverse flange in accordance with one embodiment of the present invention.

As shown in FIG. 4, the transverse flange 100 includes a duct wall 102 having an inside surface 104 and an outside surface 106. The flange 100 further includes a first upturned portion 108 which extends substantially perpendicularly from the duct wall 102, and a second rearwardly bent portion 110 extending substantially parallel to, and opposite of, the duct wall 102.

The end of second rearwardly bent portion 110 is turned over toward duct wall 90 and rounded back forming a third return portion 112. That is, as illustrated in FIG. 4, the second rearwardly bent portion 110 is turned approximately 180° towards the outside surface 106 of the duct wall 102. The return portion 112 is extended to form a fourth L-shaped portion 114 having a fifth portion 116 arranged to extend adjacent to and in close relation with the outside surface 106 of the first upturned portion 108.

Figure 3:
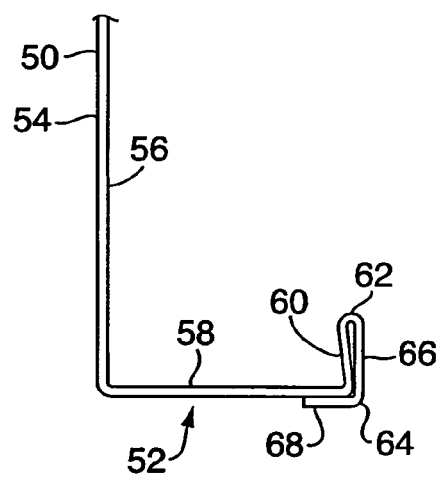
FIG. 3 is a sectional view of yet another prior art integral duct flange.

One important aspect of the present invention is therefore that the third return portion 112 is bent back towards the duct wall 102, thus leaving a substantially smooth inner surface 104 extending along the first upturned portion 108. That is, as opposed to the non-planar, inside surface 54 shown in prior art FIG. 3, the first upturned portion of the transverse flange 100 provides a smooth mating surface, owing to the third return portion being turned towards the outside of the transverse flange 100.

Moreover, it will be readily appreciated that by causing the fifth portion 116 to extend a measured distance along the first upturned portion 108, the transverse flange 100 may be correspondingly strengthened. Indeed, the present invention contemplates that the fifth portion 116 may extend beyond the midpoint of the first upturned portion 108 (as shown in phantom in FIG. 4) to impart even greater strength to the transverse flange 100.

Turning again to FIG. 4, the first upturned portion 108 defines a pocket, or bead, 122 adjacent the duct wall 102. The pocket 122 is formed so as to protrude towards the outside surface 106 of the duct wall 102. As will be seen in FIG. 4, the pocket 122 protrudes by at least an amount substantially equal to the thickness, or gauge, of the fifth portion 116 so as to enable a corner piece 124 to seat flatly in the channel defined by the opposing third return portion 112 and the duct wall 102.

It is therefore another important aspect of the present invention that the transverse flange 100 includes an outwardly protruding pocket 122 in the first upturned portion 108 to compensate for the thickness of the outwardly turned fifth portion 116. That is, the pocket 122 protrudes so as to be substantially coplanar with the exterior surface of the fifth portion 116, thus providing a bearing surface against which the corner piece 124 can flatly lay. As will also be appreciated, the pocket 122 also serves to significantly strengthen the first upturned portion 108.

It will be readily understood that the first upturned portion 108 is greatly strengthened by the heretofore-unknown combination of the fifth portion 116 and the pocket 122. Indeed, the inclusion of the pocket 122 in the first upturned portion 108 means that the fifth portion 116 may not have to extend beyond the midpoint of the first upturned portion 108 to maintain the stiffness and strength of the first upturned portion 108, resulting in reduced material use and cost.

Figure 5:
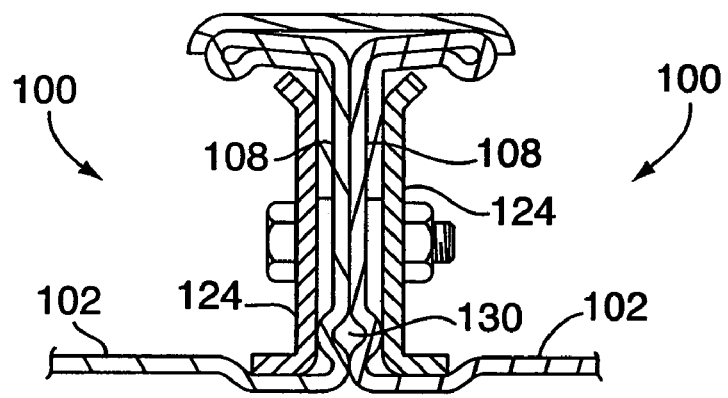
FIG. 5 is a cross-sectional view of the sealant channel formed when two flanges in accordance with FIG. 4 are mated to one another.

The pocket 124 has yet another advantageous use in connection with the transverse flange 100. By forming the pocket 122 in the first upturned portion 108, a channel 130 may be defined between the outside surfaces 104 of opposing flanges, as shown in FIG. 5. The channel 130 may thereafter be filled with caulking or other sealant, making the duct airtight.

Figure 1:
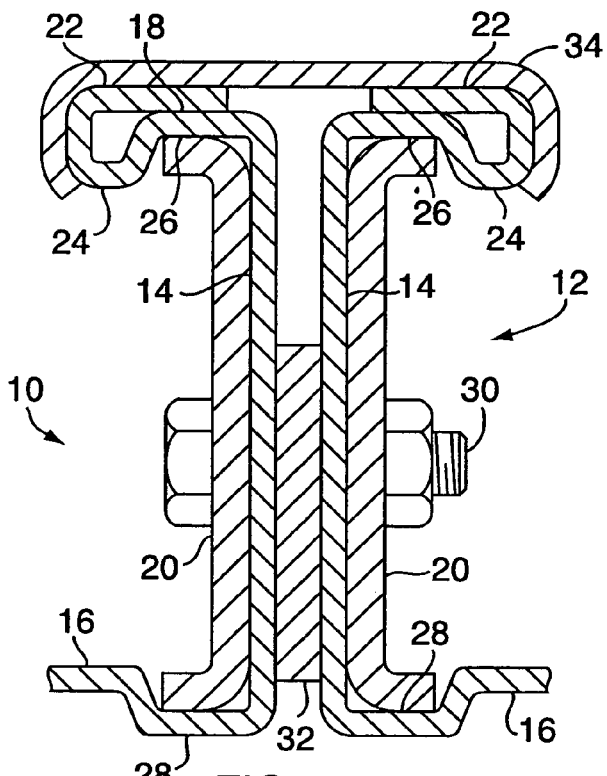
FIG. 1 is a fragmentary, cross-sectional view of a prior art duct joint representative of known duct connecting systems.
Figure 2:
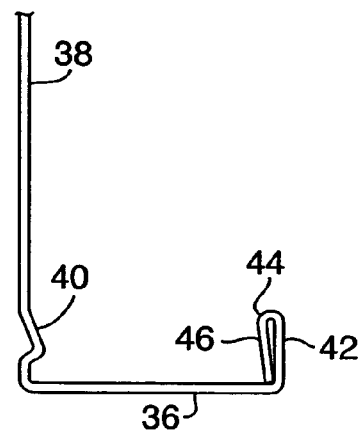
FIG. 2 is a sectional view of another prior art duct wall and integral flange.

Although FIG. 5 illustrates two integral transverse flanges 100 being directly mated to one another, it will be readily appreciated that a shock absorber, or elastic spacer, may be disposed between the first upturned portions 108 of the two flanges 100, similar to the location of the spacer 32 shown in FIG. 1. With either configuration, the channel 130 provides a cavity that may be filled with any known sealant or caulking compound. Moreover, the increased cross-sectional dimension of the sealant disposed within the channel 130 acts to prevent the unintended dislodging of the sealant from the channel 130 in a manner not possible with integral transverse flanges not having the pocket 122 formed in the first upturned portion 108.

An example of the transverse flange 100 made in accordance with one embodiment of the present invention is provided based on a 20 gauge sheet metal having a thickness of 0.035 inches. The first upturned portion 108 has a length of approximately between 0.75 inches to 1.5 inches, and the second rearwardly bent portion 110 has a length of approximately between 0.35 to 0.5 inches. Moreover, as shown in FIG. 4, the second rearwardly bent portion 110 is preferably formed at an 85° angle to the first upturned portion 108. It will of course be readily appreciated that the present invention is not limited by any particular dimensional or angular constraints.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. An integral transverse flange for a duct, said flange comprising:
    a first upturned portion extending substantially perpendicularly from a duct wall of said duct,
    a second portion bent rearwardly from said first upturned portion,
    a third return portion turned toward said duct wall and rounded back toward said first upturned portion from said second portion;
    a fourth L-shaped portion extending from said third return portion, said L-shaped portion having a first arm arranged adjacent to and in close relation with said second portion and a second arm arranged adjacent to and in close relation with said first upturned portion; and
    a bead formed in said first upturned portion, wherein said bead protrudes outwardly from said first upturned portion to an extent substantially equal to a thickness of said second arm.

2. The integral flange of claim 1, wherein:
    said bead protrudes outwardly from said first upturned portion to an extent substantially planar to an exterior surface of said second arm.

3. The integral flange of claim 1, wherein:
    said bead protrudes outwardly from said first upturned portion to an extent substantially equal to a thickness of said duct wall.

4. The integral flange of claim 1, wherein:
    said bead protrudes outwardly from said first upturned portion into a channel formed between said duct wall and said second portion.

5. An integral transverse flange for a duct, said flange comprising:
    a first upturned portion extending substantially perpendicularly from a duct wall of said duct;
    a second portion bent rearwardly from said first upturned portion,
    a third return portion rounded back and toward said first upturned portion from said second portion;
    a fourth L-shaped portion extending from said third return portion, said L-shaped portion having a first arm arranged adjacent to and in close relation with said second portion and a second arm arranged adjacent to and in close relation with said first upturned portion; and
    a bead formed in said first upturned portion, wherein said bead protrudes outwardly from said first upturned portion to an extent so as to be substantially planar to an exterior surface of said second arm.

6. The integral flange of claim 5, wherein:
    said bead protrudes outwardly from said first upturned portion into a channel formed between said duct wall and said second portion.

7. A sheet metal duct section comprising:

a duct wall, said duct wall having an end; and an integral transverse flange formed at said end of said duct wall, wherein said integral transverse flange comprises a first upturned portion which extends perpendicularly outwardly from said end of said duct wall, a second portion bent rearwardly from said first upturned portion, and a third return portion providing a L-shaped double wall portion having a first arm arranged adjacent to and in close relation with said rearwardly bent portion and a second arm arranged adjacent to an in close relation with said upturned portion; and a bead formed in said first upturned portion, wherein said bead protrudes outwardly from said first upturned portion to an extent substantially planar to an exterior surface of said second arm.

8. The integral flange of claim 7, wherein:

said third return portion is turned toward said duct wall and rounded back toward said first upturned portion from said second portion.

9. A method of forming an integral transverse flange for a duct, said method comprising the steps of:

extending a first upturned portion substantially perpendicularly from a duct wall of said duct;

bending a second portion rearwardly from said first upturned portion;

rounding back a third return portion toward said first upturned portion from said second portion;

extending a fourth L-shaped portion from said third return portion, said L-shaped portion having a first arm arranged adjacent to and in close relation with said second portion and a second arm arranged adjacent to and in close relation with said first upturned portion;

forming a bead in said first upturned portion,; and forming said bead to protrude outwardly from said first upturned portion by at least an amount necessary so as to be substantially planar with an exterior surface of said second arm.

\* \* \* \* \*